June 4, 1963

C. K. STEDMAN 3,091,971

DAMPED VIBRATIONAL SYSTEMS

Filed Jan. 26, 1959

INVENTOR.
CECIL K. STEDMAN
BY
ATTORNEY

June 4, 1963  C. K. STEDMAN  3,091,971
DAMPED VIBRATIONAL SYSTEMS
Filed Jan. 26, 1959  5 Sheets-Sheet 2

INVENTOR.
CECIL K. STEDMAN
BY
ATTORNEY

June 4, 1963  C. K. STEDMAN  3,091,971
DAMPED VIBRATIONAL SYSTEMS
Filed Jan. 26, 1959  5 Sheets-Sheet 3

CECIL K. STEDMAN
INVENTOR.

BY *Philip Subkow*

ATTORNEY

FIG. 9.

United States Patent Office 3,091,971
Patented June 4, 1963

1

3,091,971
DAMPED VIBRATIONAL SYSTEMS
Cecil K. Stedman, Enumclaw, Wash., assignor to Statham Instruments, Inc., Los Angeles, Calif., a corporation of California
Filed Jan. 26, 1959, Ser. No. 789,138
28 Claims. (Cl. 73—515)

This invention relates to damping of a movable mass suspended on a flexible support such that on imposition of a transient or oscillatory force which displaces the mass from rest position, the mass undergoes damped oscillatory motion on the flexible support.

This invention is particularly directed to the damping of such masses in instrument systems, for example, accelerometers, vibrometers and pressure gauges.

In prior art systems of the above type the damping means is rigidly connected to the mass. The damping means imposes a resistance to the motion of the mass as it undergoes oscillatory motion on its spring suspension. Considering the above system with the mass disconnected from the damping means, the mass will extend the spring in an amount depending on the mass M and the Hooke's law spring constant K of the spring. This extension $X_0$ is the static value of the response with the force applied steadily, i.e. at zero frequency.

When such a mass is in free oscillation imposed by a transiently applied force, the frequency of its oscillation is termed its natural frequency and is $f_n$ and is given in cycles per second by the following equation:

$$f_n = \frac{1}{2\pi}\sqrt{\frac{K}{M}} \qquad (Eq.\ 1)$$

Since the oscillation is sinusoidal, the above Equation 1 may be written:

$$w_n = 2\pi f_n = \sqrt{\frac{K}{M}} \qquad (Eq.\ 2)$$

where $w_n$ is the natural frequency expressed in radians per second.

When such an undamped mass undergoes forced vibration by a sinusoidally applied force of constant magnitude but at varying frequency, the relative response (R), i.e. the ratio of the displacement of the mass at a given applied frequency to the displacement of the mass at zero frequency, increases as the frequency increases and approaches infinity as the applied frequency approaches the natural frequency.

It will thus be seen that the response, i.e. the excursion of the mass, varies so severely with frequency of the forcing oscillation as to make such systems of small value in the field of instrumentation.

The introduction of damping limits the excessive excursion of the mass as the frequency of the forcing oscillation approaches the natural frequency. This is accomplished in prior art systems by opposing the motion of the mass by a damping force whose value is proportional to the velocity of the mass. When the damping is by mechanical means this is done by rigidly connecting the mass to a device which is generically described as a dashpot in which a fluid is caused to be displaced by the motion of the mass and a frictional or viscous drag is imposed on the mass. Electrical means may also be employed.

2

The constant between the damping force which opposes the motion of the mass and the velocity of the mass is termed the damping constant symbolized by the letter "$c$."

The ratio "$h$" is the ratio of the above value of $c$ to the value of $c$ at critical damping termed the critical damping coefficient $c_c$, defined as $$c_c = 2[KM]^{\frac{1}{2}}$$

The above systems are termed one degree of freedom systems since the position of the system is fixed by one variable, i.e. the extension $X_0$ of the spring.

In such systems if we define $$e = w/w_n \qquad (Eq.\ 3)$$

where "$w$" is the frequency of the forcing oscillation in radians per second, and if we set the static response, i.e. the zero frequency response as unity, the relative response (the ratio equal to the excursion under a constant accelerating force at any frequency divided by the excursion of the mass at zero frequency) is given by the following equation:

$$R = [(1-e)^2 + (2he)^2]^{-\frac{1}{2}} \qquad (Eq.\ 4)$$

This equation gives a family of response curves depending on the value of "$h$." Such curves are given in standard works, for example, "Survey of Pickups for Dynamic Measurements" by Gifford E. White, published by American Society of Testing Materials in Special Technical Publication No. 104, 1950. Practical considerations limit the value of "$h$" to be about 0.7 of critical damping as the best compromise for damping of such systems.

However, the consequence of this restriction of the chosen value of "$h$" is that the relative response can be substantially the same as the static response up to only 0.4 of the "natural frequency." If the system will tolerate a change in relative response up to ±5% of the static response, then for this value of "$h$"=.707 we may tolerate forcing frequencies up .55 of the "natural frequency." If a damping ratio of less than "$h$"=.707 is acceptable and a variation of the relative response of plus or minus 5% of the static or zero frequency response is acceptable, we may push this frequency to 0.86 of the natural frequency.

Experience has shown that the maximum deviation which is tolerable in an instrument system of the above character is ±5% of the static response. Deviations beyond this limit result in measurements which are not useful. The above systems are thus restricted to forcing frequencies lower than about .8 of the natural frequency.

I have devised a damping system which frees the designer of damping systems from the restrictions of the one degree of freedom systems. In my system we may obtain the desired flat response, to the desired degree, with frequencies up to a substantially greater fraction of or even to a multiple of the natural frequency, i.e., to frequency much higher than for the single degree of freedom systems of the same natural frequency.

I accomplish this result by introducing a compliance into the damping system. In the simple case this may be accomplished by introducing a spring or its mechanical equivalent between the mass and the means which creates the damping resistance.

In my invention the damping force may be introduced in conjunction with an auxiliary spring in such a way that the effective stiffness of the system increases as the frequency rises.

This invention will be further described by reference to the drawings, of which—

Figure 7:
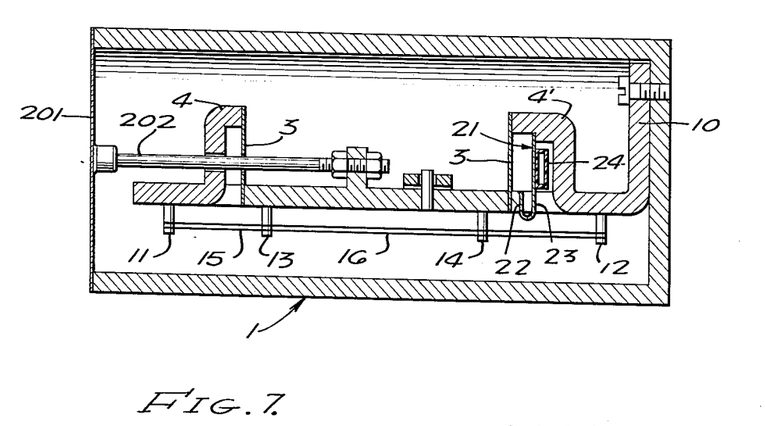
FIG. 7 is an adaptation of the systems of FIGS. 1–6 to a pressure transducer.

FIGS. 1–6 illustrate the application of the system of my invention to an accelerometer and FIG. 7 illustrates its application to a pressure gauge. The invention is applicable to any other transducers in which the deflection of a damped mass is to be sensed by a pick off. Such systems are generically disclosed in FIG. 8.

Figure 8:
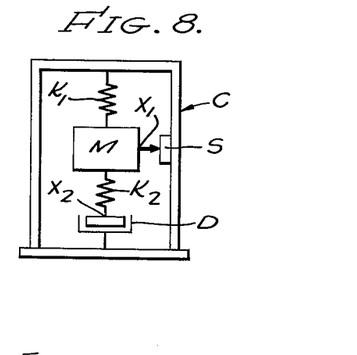
FIG. 8 is a schematic drawing illustrating the systems of FIGS. 1–7 and showing the principles of my invention.

In FIG. 8, M is the mass whose motion it is desired to damp. It is suspended in a case C by means of a spring $K_1$ and it is damped by a damping means D shown generically as a dashpot. The dashpot is rigidly connected to the case and by means of spring $K_2$ to the mass M. The springs each have a spring constant $K_2$ and $K_1$ respectively and the dashpot is a mechanical dashpot. The displacement of the point $x_1$ is referenced to the case and is generically illustrated by a pointer moving over a scale "$s$." The mass M in this system is so large with respect to the mass of the springs $K_2$ and $K_1$ and the damper that these latter masses may be omitted from consideration. The natural frequency $f_n$ is given by Equation 1 determined in the same manner where K of Equation 1 is now $K_1$.

The velocity of the mass is represented by V, and is shared between the spring $K_2$ and the damper D. The velocity of the ends of the spring $K_1$ at $x_1$ is $V_1$; of the spring $K_2$ at $x_2$ is $V_2$ the velocity of the movable element of the damper. The damping force is then equal to $cV_2$ and it acts on the spring $K_2$.

As in the case of the simple system we are interested in the relative response of the systems for various frequencies.

In the systems of my invention the relative response R is given by the following expression:

$$R = \left\{ \left[ (1-e^2) + \frac{2nde^2}{n^2+e^2} \right] + j\left[ \frac{2edn^2}{n^2+e^2} \right] \right\}^{-1}$$
(Eq. 5)

where $j = [-1]^{1/2}$ and the absolute value of R, i.e. |R| is $$|R| = \left\{ \left[ (1-e^2) + \frac{2nde^2}{n^2+e^2} \right]^2 + \left[ \frac{2edn^2}{n^2+e^2} \right]^2 \right\}^{-1/2}$$
(Eq. 6)

where $e$ has the meaning as above and $$n = \frac{K_2}{2\pi f_n c}$$
(Eq. 7)

$$d = \frac{\pi f_n c}{K_1}$$
(Eq. 8)

The addition of the spring $K_2$ and dashpot D will clearly not affect the range of the instrument as measured at zero frequency, i.e. the static response, because the dashpot exerts force only when there is relative motion of its parts. However, as the forcing frequency rises, the force exerted by the dashpot increases, and a compression and extension of spring $K_2$ occurs, and the mass responds as though it were restrained by a spring which is stiffer than $K_1$. If the magnitudes of the elements are properly proportioned the net result is a frequency response which remains flat to within the desired tolerance up to a desired frequency which may be equal to or in excess of the natural frequency.

The above system may be termed a two degrees of freedom system determined by the motion of the points $x_1$ and $x_2$ of FIG. 8.

The shape of the response curve given by Equation 6 is set by selecting the values of $d$ and $n$.

Figure 9:
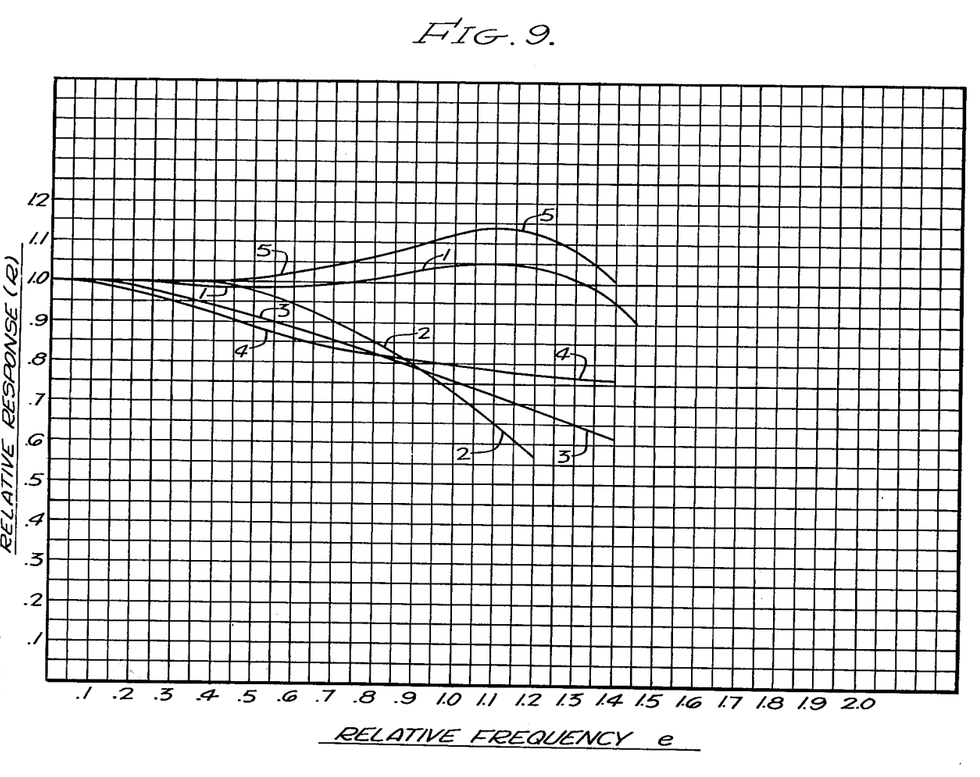
FIGS. 9 and 10 are curves illustrating my invention.

FIG. 9 illustrates the effect of the values of $d$ and $n$ on the shape of the response curve. Thus curve 1 has values of $d=0.54$ and $n=2$. In curve 3, $d=0.7$ and $n=3$. In curve 4, $d=0.7$ and $n=2$. In curve 5, $d=0.5$ and $n=2$. In comparison I have plotted in curve 2 the relative response curve for a simple one degree of freedom system damped with a damping coefficient of 0.7

A study of these curves will reveal the superiority of my system of damping as compared with the prior art systems. For example, curve 1 shows that the system is within 2% of the statis response up to 0.9 of the natural frequency and is within ±5% of the static response up to about 1.4 times the natural frequency. The relative response of a one degree of freedom system of .7 damping (see curve 2, FIG. 9) at .5 of the natural frequency is less than the static response by an amount equal to about 3% of the static response. The relative response of the one degree of freedom system has dropped 5% of the static response at a frequency of about .58 of the natural frequency. In fact, with a permissible ±5% variation from the static response, the highest frequency permissible in a one degree of freedom system is with the damping coefficient of .59. In such case the relative response will be within the range of .95 to 1.05 times the static response of all frequencies up to about 86% of the natural frequency. Another important distinction between the system of my invention and the simple system is that in the latter case the phase shift is 90° at the natural frequency, while in the systems of my invention the phase shift is less than 90°, for example, in the case of the system of curve 1 it is only 64° at the natural frequency. For values of $n$ between 2 and 3, and for values of $d$ between .5 and .6, the phase shift is between 60° and 80°, depending on the value of $d$ and $n$.

As has been pointed out above, a response curve of desired shape may be obtained by a suitable selection of the values of $d$ and $n$. However, as a practical matter, it will be found that a useful damping will be obtained and satisfactory response curves may be had up to the natural frequency, with a variation from the static response of no more than ±5% of the static zero frequency response, by selecting values of $d$ and $n$ to be within the area ABCD embraced by curves of FIG. 10. The upper curve A—B gives the limits of the values of $n$ and $d$ which will give a deviation of the relative response not greater than —5% of the static response up to $e=1$. The lower curve C—D gives the limits for the values of $d$ and $n$ for a deviation of the relative response not greater than +5% of the static response up to a value of $e=1$. The curve AD is the boundary outside of which the relative response curves have a dip of greater than —5% of the static response, at values of $e$ less than 1. The curve BC is the boundary outside of which the relative response curves have a resonance peak of greater than +5% of the static response for values of $e$ less than 1.

Figure 10:
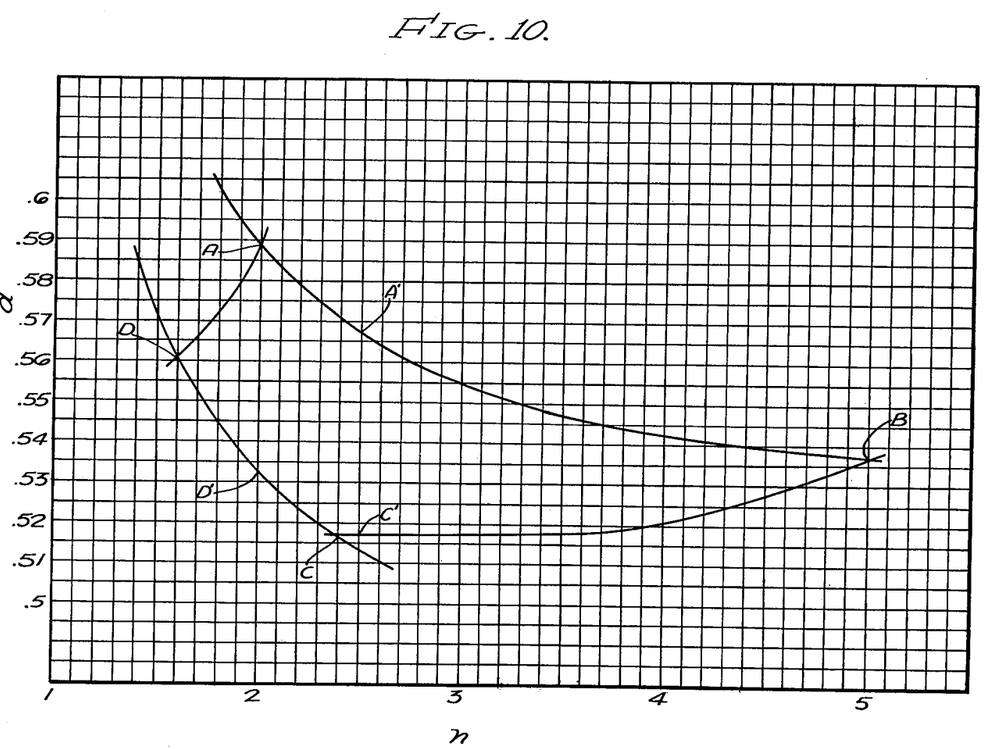

The effect of the values of $n$ and $d$ on the relative response at $e=1$ may be seen by setting $e=1$ in Equation 6, from which it appears $$R = \frac{1}{2d}\left(\frac{1+n^2}{n^2}\right)^{-1/2}$$
(Eq. 9)

Table 1 gives the values from which the above curves of FIG. 10 have been derived.

*Table 1*

| n | −5% at e=1 | +5% at e=1 | limit due to dip, 5% | limit due to peak, 5% |
|---|---|---|---|---|
| 1.4 | ------ | .585 | ------ | ------ |
| 1.6 | ------ | .561 | .561 | ------ |
| 1.8 | .602 | .545 | .572 | ------ |
| 2.0 | .589 | .532 | .589 | ------ |
| 2.2 | .578 | .523 | ------ | ------ |
| 2.4 | .571 | .517 | ------ | .517 |
| 2.6 | .564 | .510 | ------ | ------ |
| 2.8 | .559 | ------ | ------ | ------ |
| 3.0 | .555 | ------ | ------ | ------ |
| 3.2 | .551 | ------ | ------ | ------ |
| 3.4 | .548 | ------ | ------ | ------ |
| 3.6 | .545 | ------ | ------ | .518 |
| 3.8 | .544 | ------ | ------ | ------ |
| 4.0 | .543 | ------ | ------ | ------ |
| 4.5 | .540 | ------ | ------ | .527 |
| 5.0 | .537 | ------ | ------ | .537 |

I thus desire to use values of $n$ and $d$ such that the points defined by the chosen values of $n$ and $d$, in the claims referred to as corresponding values of $n$ and $d$, lie in the area ABCDA. Thus permissible values for $d$ lie within the region of about .5 to .6 and selected values of $n$ within the range of about 1.6 to about 5. However, $n$ values in the vicinity of about 2 to about 2.5 give better response curves than do higher values $n$, which give curves that cut off sharply. Thus the preferred area is that portion of the area ABCDA of FIG. 10 in which the $n$ value is from about 2 to about 2.5 and the values of $d$ for $n$ equal to about 2 varies from about $d=.53$ to about $d=.59$ and for $n$ equal to about 2.5, $d$ varies from about $d=.51$ to about $d=.57$. This area is defined by the curve from A to A', the line A' to C', the curve C' to C, the curve C to D' and the line D' to A, this area being symbolized as the area AA'C'CD'A. Corresponding values of $d$ and $n$ defining points within the area AA'C'CD'A will give the preferred values of $n$ and $d$.

Figure 1:
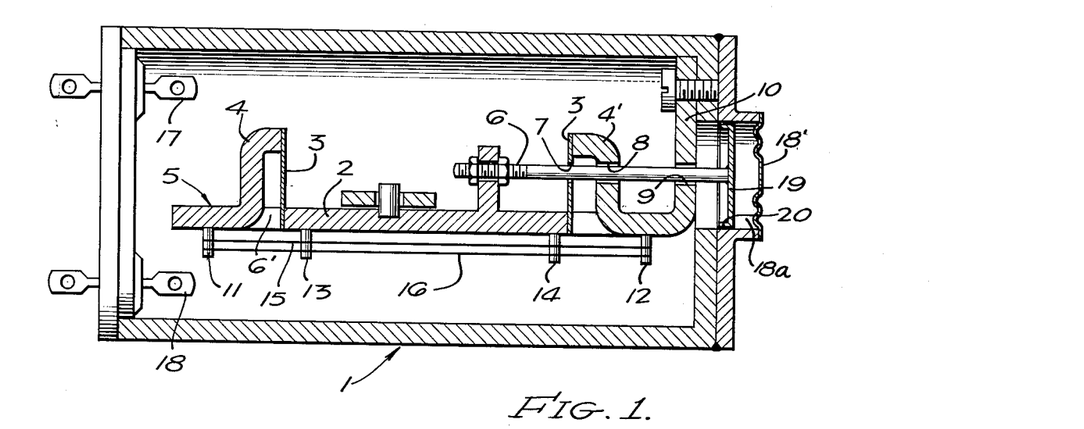
FIG. 1 is a section through one form of a system of my invention.

Such systems are exemplified in the structure of FIG. 1. In this figure, the case 1 carries an accelerometer in the form of a plate 2, suspended on flat springs 3 on brackets 4 and 4', and is positioned in the square hole 6' of frame 5. The frame 5 is mounted by the studs in the case. The rod 6 is connected to the plate 2 by a nut and passes through bore 7 in the spring 3 and bore 8 and 9 in the brackets 4' and 10. The plate 2 and the frame 5 carry insulated pins 11, 12, 13 and 14, to which electrical resistance strain wires 15 and 16 are connected. There are four wires so mounted and connected to terminals 17 and 18. The displacement of the plate 2 by an acceleration of the case 1 results in an increase in tension of one set of wires and a decrease in tension of another set of wires. The relative displacement of the plate 2 with respect of the frame and the case due to an applied force, in this case, acceleration is thus measured in the change in electrical resistance of the strain wires. The strain wire transducer illustrated is the well known Statham strain wire transducer. See Statham Patent 2,573,286 and National Bureau of Standards Circular 528, p. 31.

In such prior art systems the damping is usually occasioned by making the peripheral gap between the plate 2 and the edge of the hole 6' very small. The damping of the mass 2 is caused by the viscous drag in the liquid which is used to fill the case in such accelerometers and is thus in the peripheral gap. Instead of using a strain wire transducer to report the motion of the plate 2 with respect to the frame 5, I may use any other well known type of transducer, for example, either an inductive or capacitive pick off, as will be clear to those skilled in the art.

In my invention, I do not rely on any such damping and in fact make the peripheral orifice so large and the spaces about the frame 5 and the brackets 4 and 4' and the bores 7 and 8 and 9 so great that these create substantially no resistance to the displacement of the plate 2 or such resistance which is substantially constant irrespective of the velocity of motion of the plate 2 or the frequency with which it oscillates with respect to the frame 5.

The damping is of the motion of the plate 2 in FIG. 1 is occasioned by the dashpot which is closed by a flexible diaphragm 18' forming one wall of the dashpot chamber 18a and in which a loosely fitting piston 19 is positioned within the cylindrical wall of the dashpot 18a. The case 1 and the dashpot are filled with a suitable liquid such as an oil of suitable viscosity as in the case of the aforementioned instruments.

It will be seen that the mass of the plate 2 and the rod 6 and the piston 19 correspond to the mass M of FIG. 8, the springs 3 correspond to the spring $K_1$ and the flexible diaphragm 18' corresponds to the spring $K_2$. Fluid passing through the orifice 20, between the edge of the piston and the wall of the chamber 18, is proportional to the displacement of the piston 19 minus the displacement of the diaphragm 18'. Similarly in FIG. 8 the motion of the dashpot D is the motion of the mass M minus the stretch of the spring $K_2$. It will be seen, however, that the force exerted by the dashpot will cause a deflection of the flexible diaphragm 18' and the mass will respond as though it were restrained by a stiffer spring system than the springs 3 and the strain wires alone. The diaphragm 18' thus acts similarly to springs $K_2$ and the construction of FIG. 1 is the equivalent of the system illustrated schematically in FIG. 8 and will respond as described above in connection with FIG. 8. The above construction thus provides one means for yieldably coupling the mass of 2 with the dashpot by means of a spring which in this case is the diaphragm 18', which acts as the spring $K_2$.

Figure 4:
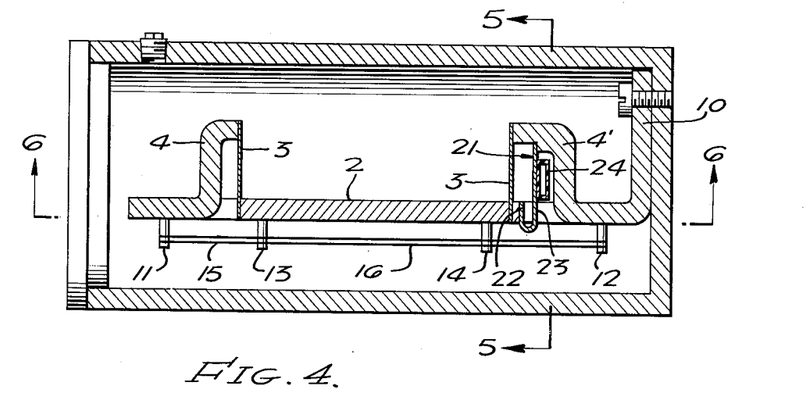
FIG. 4 is a section taken through still another form of my invention.
Figure 5:
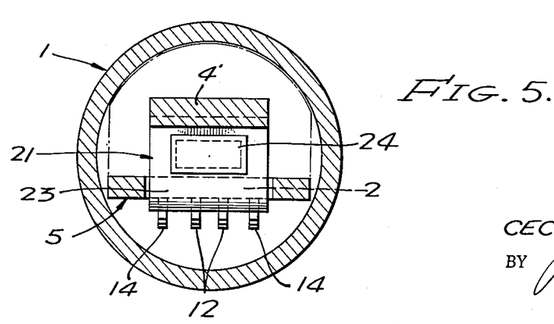
FIG. 5 is a section on line 5—5 of FIG. 4.
Figure 6:
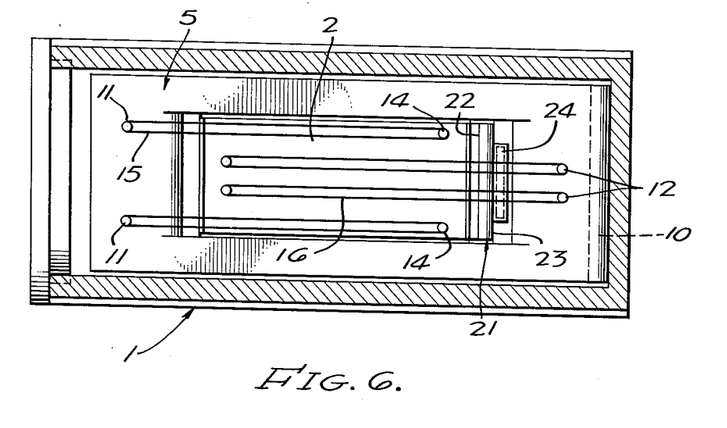
FIG. 6 is a section taken on line 6—6 of FIG. 4.

FIG. 4 illustrates a variation in which the spring is between the mass and the dashpot, being rigidly connected to the dashpot at one end and to the mass at the other end, and thus provides a further means for yieldably coupling the mass of 2 with the dashpot by means of a spring such that the motion of the mass 2 is shared between the spring and the mass 2 as in the case of the forms of FIG. 1 and illustrated by FIG. 8. In this case the dashpot 17, piston 19, spring 18 and rod 6 connected to the plate 2 are omitted. An additional hook-shaped spring 21 is connected at one end of the leg 23 to the bracket 4', the leg 22 being connected to the plate 2. The leg 23 carries a plate 24. The plate 24 is spaced from the face of the bracket 4' so as to make the spacing a narrow orifice about the edges of the plate 24. The spring 21 and mass of plate 24 is made as small as convenient. The plate 24 may be made of material such as plastic and also made hollow so that it will be as nearly inertialess as is convenient or as possible.

It will be seen that as the mass 2 oscillates with respect to the case, its motion will be transmitted to plate 24 through the leg 23 of the spring 21 and the liquid will be squeezed between the plate 24 and the bracket 4' at the edges of plate 24 and thus the viscous drag of the liquid will act in the same way as in the dashpot 17. The spring legs 22—23 corresponds to $K_2$ in FIG. 8.

In the forms illustrated in FIGS. 1 and 4, the damper is a liquid damper and the spring $K_2$ is a mechanical spring. The effect of the spring and the damper may be combined in one, in the form of a gas damper, termed an acoustic damper as described and claimed in my companion case, Serial Nos. 615,397 filed October 11, 1956, now Patent No. 2,909,364, and 710,881 filed January 24, 1958, now abandoned of which this application is a continuation-in-part, and these applications are herein incorporated by this reference. In the system of these applications the damping is caused by means of a chamber in which a gas is compressed and forced through an orifice.

The compressing member may be a displaceable wall of the chamber, i.e., a flexible diaphragm or a rigid piston. The diaphragm or piston is connected to the vibrating system and thus transmits the vibrations to air or other gas in the chamber to generate acoustic energy at the frequency of the vibrating system and to force the gas through the single or multiple orifices. For convenience of description, I will refer to the chamber as the "damping chamber," the compressing means as the "diaphragm."

Figure 2:
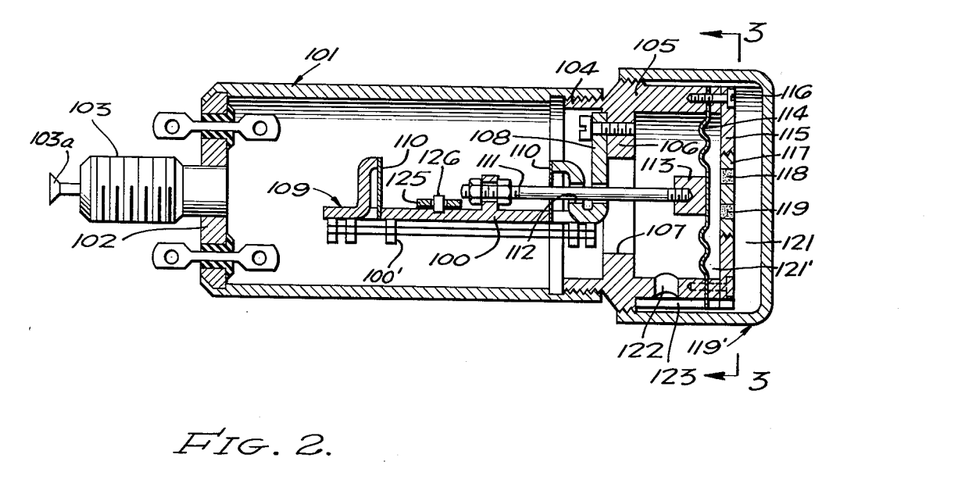
FIG. 2 is a section through another form of system of my invention.
Figure 3:
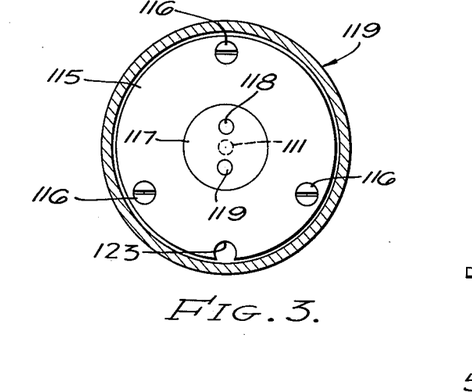
FIG. 3 is a section taken on line 3—3 of FIG. 2.

The orifice may be either an open hole of proper dimensions or the hole may be closed by a porous diaphragm or by a plate with a plurality of holes. Both types of orifices are referred to as a foraminated closure. One such system is shown in FIG. 2.

In this figure the case 101 of an accelerometer has mounted at one end a pressure-tight cap 102 to which an inlet 103 is connected. The other end of the case 101 is connected to the cylindrical flange 104 mounted on the ring 105 carrying an internal shoulder 106 with a central bore 107. To the shoulder 106 is connected the bracket 108 which carries frame 109 having a central opening in which the rectangular mass 100 is mounted on two flat springs 110. Mounted in the mass and frame are insulated pins 100' over which are wound strain wires in a construction similar to the construction shown in Statham et al. Patent No. 2,573,286.

The mass 100 is connected by means of a rod 111 passing through an opening 112 in the bracket 108 and is connected to the cylindrical boss 113, which is in turn connected to a flexible metallic diaphragm 114 clamped at its edges to the ring 105 by means of the cap 115 via studs 116. Centrally positioned by the cap 115 is a plate 117 carrying two porous plugs 118 and 119. Instead of porous plugs I may employ a plurality of capillary bores. The chamber between diaphragm 114 and cap 115 forms the damping chamber 121'. The case 119' makes a fluid-tight seal with ring 105 and defines the chamber 121 between the cap 115 and case 119'. The chamber 21 communicates with terminal chamber 120 on the other side of the diaphragm via bores 122 and 123. The case 119' and bores 123 and 122 may be present or omitted and the plugs may thus communicate with the atmosphere or other environment in which the unit is placed if the ambient pressure outside the chamber 121 and equal pressure, i.e. ambient pressure in case 101, is adequate, as is more fully described in my co-pending application Serial No. 615,397, now Patent 2,909,364, of which this application is a continuation-in-part.

The oscillation of the mass 100 on the springs 110 transmitted to the diaphragm 114 causes an alternate compression and rarefication of the gas in chamber 121' to cause the gas to flow back and forth through the porous plugs 119 and 118 between chambers 121' and 120. The maximum excursion of the mass 100 and the maximum change of volume in the damping chamber is fixed by fixing the stops 125 and 126.

In such systems the value of the parameters $K_1$, $c$ and $K_2$ corresponding to the system illustrated by FIG. 8 are given as follows:

$$K_2 = A_e^2 \left( \frac{p_0}{v_0 + kp_0} \right) \quad \text{(Eq. 10)}$$

$$c = \left( \frac{R_1 b}{A_p} \right) A_e^2 \quad \text{(Eq. 11)}$$

$$K_1 = S_1 + S_2 \quad \text{(Eq. 12)}$$

It will be noted that in this system the lever ratio is 1:1—that is, the deflection of the center of the diaphragm 114 is equal to the motion of the mass 100. If a different linkage is employed so the motion of the diaphragm is other than equal to that of the mass, the value of $K_1$ must be adjusted to allow for this lever ratio by multiplying the value of $S_2$ by the square of the lever ratio; i.e.

$$K_1 = S_1 + (L_1/L_2)^2 S_2 \quad \text{(Eq. 13)}$$

when $L_1/L_2$ is the lever ratio.

The above terms are defined as follows:

$p_0$ is the average ambient pressure in the damping chamber.

$v_0$ is the volume of the chamber 121' when the diaphragm 114 is undeflected.

$b$ is the length of the plugs 118 and 119 or of the capillary bores if used in place thereof.

$A_e$ is the effective area of the diaphragm 114 exposed to the chamber 121', defined such that the deflection of the mass 101 on the springs multiplied by $A_e$ equals the change in volume of the chamber 121'.

$R_1$ is the specific flow resistance through the foraminated closure per unit length of the plug or capillary pasageways. In capillary bores $$R_1 = \frac{8vA_p}{o\pi r^4} \quad \text{(Eq. 14)}$$

where $A_p$ has the meaning as defined herein, $o$ is the number of capillary bores and $v$ is the viscosity of the gas in the bores and $r$ is the radius of the bores. For porous plugs and other bores, $R_1$ may be determined by well known procedures. (See "Acoustic Measurements" by Beranek, published by John Wiley & Sons, page 844.)

$A_p$ is the effective cross-sectional area of the foraminated closure, i.e. the sum of the effective cross-sectional area of the plugs 118 and 119 or the area of the plate just including the capillary bores if these are used in place of the plug.

$S_1$ is the stiffness of the springs on which the mass 100 is suspended.

$S_2$ is the stiffness of the diaphragm 114.

$k$ is the volume displaced by the diaphragm per unit pressure when the center is held motionless.

In FIG. 7, the structure of FIG. 4 is applied to a pressure transducer. The displacement of the diaphragm 201 is transmitted to the plate 2 by means of a rod 202. In other respects the transducer of FIG. 7 is the same as that of FIG. 4.

It will be noted from the above description that for any given design in which the value of $c$ and $f_n$ is established, the value of $K_2$ and thus the value of $n$ may be adjusted by adjusting the pressure $p_0$ or volume $v_0$ or both $p_0$ and $v_0$. It may therefore be necessary in cases where the attained or attainable value of $v_0$ is not proper for atmospheric pressure that the pressure $p_0$ be other than atmospheric pressure. For example, if the attainable volume $v_0$ is not small enough to give the desired value of $K_2$ employing gas at atmospheric pressure, the pressure employed may be superatmospheric pressure sufficient to give the desired ratio of $p_0/v_0$.

For this purpose I have provided a gas inlet 103 which permits introducing pressure into the case 101 and establish a like pressure in chamber 121' and 121 by means of the by-pass 123 and orifices 118 and 119. This pressure may be superatmospheric pressure, for example, depending on the value of the above parameters, it may be in order of several hundred pounds. The inlet may be provided with a check valve capable of holding this pressure. Suitably it may be simply a tube 103a which may be connected to a source of gas under pressure. When the desired pressure is reached in case 101 the tube is pinched off and sealed.

While I have described a particular embodiment of my invention for the purpose of illustration, it should be understood that various modifications and adaptations thereof may be made within the spirit of the invention as set forth in the appended claims.

I claim:

1. A damped vibrational system comprising a support, a mass, a spring connected to said mass and said support, a dashpot damper, means for yieldably coupling said mass and said dashpot damper, said means including said mass, dashpot and a second spring whereby the motion of said mass is shared between the dashpot and said second spring, said mass, said springs, and the damping coefficient of said damped system having the following relation $$n=\frac{K_2}{2\pi f_n c}$$

and $$d=\frac{\pi f_n c}{K_1}$$

where $K_1$ is the Hooke's law spring constant of the spring connecting said mass and said support, $K_2$ is the Hooke's law spring constant of the second spring and $c$ is the damping coefficient, $M$ is the mass and the natural frequency $f_n$ in cycles per second is $$f_n=\frac{1}{2\pi}\sqrt{\frac{K_1}{M}}$$

and in which the values of $n$ and $d$ each have corresponding values that lie within the area bounded by the curves ABCD of FIG. 10 of the drawings forming a part of the specification of this application and in which the absolute value of the relative response of the mass is from about 1.05 to about .95 of the static response of said mass at all frequencies up to about the said natural frequency.

2. In the system of claim 1, in which said second spring is rigidly connected to said mass and to said dashpot.

3. In the system of claim 1, in which said dashpot includes a chamber, a piston in said chamber connected to said mass, an orifice connecting the interior of said chamber and the exterior thereof and in which said second spring forms one wall of said chamber.

4. In the system of claim 3, in which said orifice is between the edge of said piston and the circumambient wall of the dashpot chamber.

5. In the system of claim 1, in which the values of $n$ and $d$ each have corresponding values which lie within the area bounded by the curves and lines AA'C'CD'A of FIGURE 10.

6. In the system of claim 5, in which the said second spring is connected to said mass and to said dashpot.

7. In the system of claim 5, in which said dashpot includes a chamber, a piston in said chamber connected to said mass, an orifice connecting the interior of said chamber and the exterior thereof and in which said second spring forms one wall of said chamber.

8. In the system of claim 7, in which said orifice is between the edge of said piston and the circumambient wall of the dashpot chamber.

9. A damped vibrational system comprising a support, a mass, a spring connected to said mass and said support, a dashpot means, means for yieldably coupling said mass and said dashpot means, said means including said mass, dashpot and a second spring whereby the motion of said mass is shared between the dashpot means and said second spring, and in which system the relative response of the mass, to a sinusoidal force causing a displacement of the mass, is within the range of about 0.95 to 1.05 of the static response of said mass at all frequencies of the applied force up to the natural frequency of the mass where the natural frequency ($f_n$) equals $$\frac{1}{2\pi}\sqrt{\frac{K_1}{M}}$$

where the $K_1$ is the Hooke's law constant of said first mentioned spring and $M$ is the value of the mass, and in which said dashpot includes a chamber, a piston in said chamber connected to said mass, an orifice connecting the interior of said chamber and the exterior thereof, and in which said second spring forms one wall of said chamber, and in which said orifice is between the edge of said piston and the circumambient wall of the dashpot chamber.

10. In the system of claim 5, in which the Hooke's law constant "$K_2$" of the second mentioned spring and the damping ratio "$c$" of the system and the mass $M$ have a relationship such that the relative response R when said force is applied at the natural frequency $f_n$ is $$R=\frac{1}{2d}\left(\frac{1+n^2}{n^2}\right)^{-1/2}$$

where R has a value between 0.95 and 1.05 and $d$ has a value $$d=\frac{\pi f_n c}{K_1}$$

and $n$ has the value $$n=\frac{K_2}{2\pi f_n c}$$

11. In the system of claim 7, in which the second spring is connected to said mass and to said dashpot.

12. In the system of claim 11, in which said orifice is between the edge of said piston and the circumambient wall of the dashpot chamber.

13. In the system of claim 1, said dashpot means including a damping chamber, a flexible diaphragm closure for said chamber, and said means for yieldably coupling said mass and said dashpot means including said diaphragm and a motion-transmitting connection between said mass and said diaphragm, an orifice connecting the interior and exterior of said chamber, and a gas in said chamber.

14. In the system of claim 13, a porous plug in said orifice.

15. In the system of claim 5, said dashpot means including a damping chamber, a flexible diaphragm closure for said chamber, and said means for yieldably coupling said mass and said dashpot means including said diaphragm and a motion-transmitting connection between said mass and said diaphragm, an orifice connecting the interior and exterior of said chamber, and a gas in said chamber.

16. In the system of claim 15, a porous plug in said orifice.

17. In an instrument for determining the value of a condition to be sensed, a damped vibrational system comprising a support, a mass, a spring connected to said mass and said support, a dashpot damper, means for yieldably coupling said mass and said dashpot damper, said means including said mass, dashpot and a second spring, said mass, said springs and the damping coefficient of said damped system having the following relation:

$$n=\frac{K_2}{2\pi f_n c}$$

and $$d=\frac{\pi f_n c}{K_1}$$

where $K_1$ is the Hooke's law spring constant of the spring connecting said mass and said support, $K_2$ is the Hooke's law spring constant of the second spring, and $c$ is the damping coefficient, $M$ is the mass, and the natural frequency $f_n$ in cycles per second is $$f_n=\frac{1}{2\pi}\sqrt{\frac{K_1}{M}}$$

and in which the values of $n$ and $d$ each have corresponding values that lie within the area bounded by the curves ABCD of FIG. 10 of the drawings forming a part of the specification of this application, means to sense the magnitude of the mass as a measure of the magnitude of the condition to be sensed.

18. In the system of claim 17, in which said second spring is connected to said mass and to said dashpot.

19. In the system of claim 17, in which said dashpot means includes a piston in said chamber connected to said mass, an orifice connecting the interior of said chamber and the exterior thereof, and in which said second spring forms one wall of said chamber.

20. In the system of claim 19, in which said orifice is between the edge of said piston and said circumambient wall of said dashpot chamber.

21. In the system of claim 17, said dashpot means including a damping chamber, a flexible diaphragm closure for said chamber, and said means for yieldably coupling said mess and said dashpot means including said diaphragm and a motion-transmitting connection between said mass and said diaphragm, an orifice connecting the interior and exterior of said chamber, and a gas in said chamber.

22. In the system of claim 21, a porous plug in said orifice.

23. In the system of claim 17, in which the values of $n$ and $d$ each have corresponding values which lie within the area bounded by the curves and lines AA'C'CD'A of FIG. 10.

24. In the system of claim 23, in which said second spring is connected to said mass and to said dashpot.

25. In the system of claim 23, in which said dashpot means includes a piston in said chamber, an orifice connecting the interior of said chamber and the exterior thereof, and in which said second spring is a flexible wall of said chamber.

26. In the system of claim 23, in which said orifice is between the edge of said piston and said circumambient wall of said dashpot chamber.

27. In the system of claim 23, said dashpot means including a damping chamber, a flexible diaphragm closure for said chamber, said means for yieldably coupling said mass and said dashpot means including said diaphragm and a motion-transmitting connection between said mass and said diaphragm, an orifice connecting the interior and exterior of said chamber, and a gas in said chamber.

28. In the system of claim 27, a porous plug in said orifice.

References Cited in the file of this patent

UNITED STATES PATENTS

| | | |
|---|---|---|
| 2,440,605 | Hathaway | Apr. 27, 1948 |
| 2,570,672 | Hathaway | Oct. 9, 1951 |
| 2,573,286 | Statham et al. | Oct. 30, 1951 |
| 2,775,444 | Hadley | Dec. 25, 1956 |
| 2,776,829 | Cockram | Jan. 8, 1957 |
| 2,777,544 | O'Connor | Jan. 15, 1957 |
| 2,839,922 | Manildi | June 24, 1958 |
| 2,856,035 | Rohacs | Oct. 14, 1958 |
| 2,914,089 | Allinquant | Nov. 24, 1959 |
| 3,001,406 | Oyhus | Sept. 26, 1961 |

OTHER REFERENCES

An article entitled, "Accelerometers for Determining Aircraft Flight Loads," by Taylor, pages 473–5 and 506–7 of Engineering, April 11 and 18, 1952.